/ United States Patent US 9,528,606 B2
Hitosugi et al.  (45) Date of Patent: Dec. 27, 2016

(54) COMBINED OIL RING (71) Applicant: NIPPON PISTON RING CO., LTD, Saitama-shi, Saitama (JP)

(72) Inventors: Hideshi Hitosugi, Saitama (JP); Kenji Arai, Saitama (JP); Kazutomo Takahashi, Saitama (JP)

(73) Assignee: NIPPON PISTON RING CO., LTD, Saitama (JP)

( * ) Notice: Subject to any disclaimer, the term of this patent is extended or adjusted under 35 U.S.C. 154(b) by 0 days.

(21) Appl. No.: 14/012,617

(22) Filed: Aug. 28, 2013

(65) Prior Publication Data
US 2014/0062030 A1  Mar. 6, 2014

(30) Foreign Application Priority Data

Aug. 30, 2012 (JP) ................. 2012-190201
Mar. 27, 2013 (JP) ................. 2013-067590
Jul. 25, 2013 (JP) ................. 2013-154699

(51) Int. Cl.
*F16J 9/12* (2006.01)
*F16J 9/06* (2006.01)

(52) U.S. Cl.
CPC ........... *F16J 9/12* (2013.01); *F16J 9/068* (2013.01); *F16J 9/06* (2013.01); *F16J 9/064* (2013.01); *F16J 9/066* (2013.01)

(58) Field of Classification Search
CPC ............. F16J 9/064; F16J 9/066; F16J 9/067; F16J 9/068; F16J 9/12
USPC ................................. 277/477–480
See application file for complete search history.

(56) References Cited

U.S. PATENT DOCUMENTS

| 2,904,377 | A | * | 9/1959 | Endres et al. | 277/480 |
| 5,161,805 | A | * | 11/1992 | Watanabe et al. | 277/480 |
| 5,195,758 | A | * | 3/1993 | Erway | 277/480 |
| 7,243,596 | B2 | * | 7/2007 | Usui et al. | 92/253 |
| 9,140,361 | B2 | * | 9/2015 | Takahashi | F16J 9/066 |
| 2004/0262847 | A1 | * | 12/2004 | Inoue | C23C 8/02 277/443 |

(Continued)

FOREIGN PATENT DOCUMENTS

EP  2 365 233 A1  9/2011
JP  2011-185383 A  9/2011

OTHER PUBLICATIONS

European Patent Office, European Search Report issued in corresponding EP Application No. 13181284.4, dated Dec. 4, 2013.

*Primary Examiner* — Kristina Fulton
*Assistant Examiner* — Nicholas L Foster
(74) *Attorney, Agent, or Firm* — Sughrue Mion, PLLC (57) ABSTRACT A combined oil ring that reduces deposits between side rails and a spacer expander there between. The spacer expander includes: upper pieces and lower pieces that are alternately arranged in a circumferential direction to be spaced apart in an axial direction and the circumferential direction; coupling pieces that respectively couple the adjacent upper and lower pieces; and ear parts that erect in an inner circumferential end portion of the upper and lower pieces and push the side rails. At least one of an upper surface of each upper piece and a lower surface of each lower piece has a groove formed thereon. Ear parts have a through-hole with which the groove is communicated and a distance along the axial direction between an upper or lower surface of each ear part at a top thereof and a deepest portion of the groove is at least 0.22 mm.

3 Claims, 5 Drawing Sheets (56) References Cited

U.S. PATENT DOCUMENTS

| | | | |
|---|---|---|---|
| 2011/0221141 A1* | 9/2011 | Ayuzawa et al. | 277/434 |
| 2014/0246834 A1* | 9/2014 | Ayuzawa et al. | 277/467 |
| 2015/0145218 A1* | 5/2015 | Ooya | F16J 9/068 |
| | | | 277/477 |
| 2015/0167844 A1* | 6/2015 | Yabune | F16J 9/065 |
| | | | 277/477 |

* cited by examiner

COMBINED OIL RING

CROSS REFERENCE TO RELATED APPLICATIONS

This application is related to, and claims the benefit of priority from Japanese Patent Application No. 2012-190201, filed on Aug. 30, 2012, Japanese Patent Application No. 2013-067590, filed on Mar. 27, 2013, and Japanese Patent Application No. 2013-154699, filed Jul. 25, 2013, the contents of all of which are incorporated herein by reference in their entirety.

BACKGROUND OF THE INVENTION

Field of the Invention

The present invention relates to a combined oil ring, and, more particularly, to a three-piece combined oil ring including a pair of upper and lower side rails and a spacer expander arranged therebetween.

Description of the Related Art

Oil rings that have been known up to now scrape extra engine oil attached to a cylinder inner wall surface of an internal combustion engine, and form a proper oil film, to thereby prevent a piston from being seizure along with an operation of the internal combustion engine. Various forms have been known for such oil rings. For example, Japanese Patent Laid-Open No. 2011-185383 describes a combined oil ring including a pair of upper and lower side rails and a spacer expander arranged therebetween. The spacer expander includes: a large number of upper pieces and lower pieces that are alternately arranged in a circumferential direction so as to be spaced apart in an axial direction and the circumferential direction; coupling pieces that respectively couple the adjacent upper pieces and lower pieces; and ear parts that are each formed so as to erect in an inner circumferential end portion of each of the upper pieces and the lower pieces, and serve to push the side rails.

As described above, combined oil rings scrape extra engine oil attached to a cylinder inner wall surface of an internal combustion engine, and form a proper oil film, to thereby prevent a piston from being seizure. Unfortunately, such combined oil rings have a problem that carbon sludge and the like generated from unburned carbon and lubricant combustion products are deposited between the spacer expander and the side rails, and hinder smooth scraping of the engine oil.

In order to solve this problem, for example, in the combined oil ring described in Japanese Patent Laid-Open No. 2011-185383, at least one of an upper surface of each upper piece and a lower surface of each lower piece has a groove formed thereon, and each ear part has, formed therein, a through-hole with which the groove is communicated. The scraped engine oil flows out through the groove and the through-hole, and hence carbon sludge is prevented from being deposited between the spacer expander and the side rails.

Figure 6:
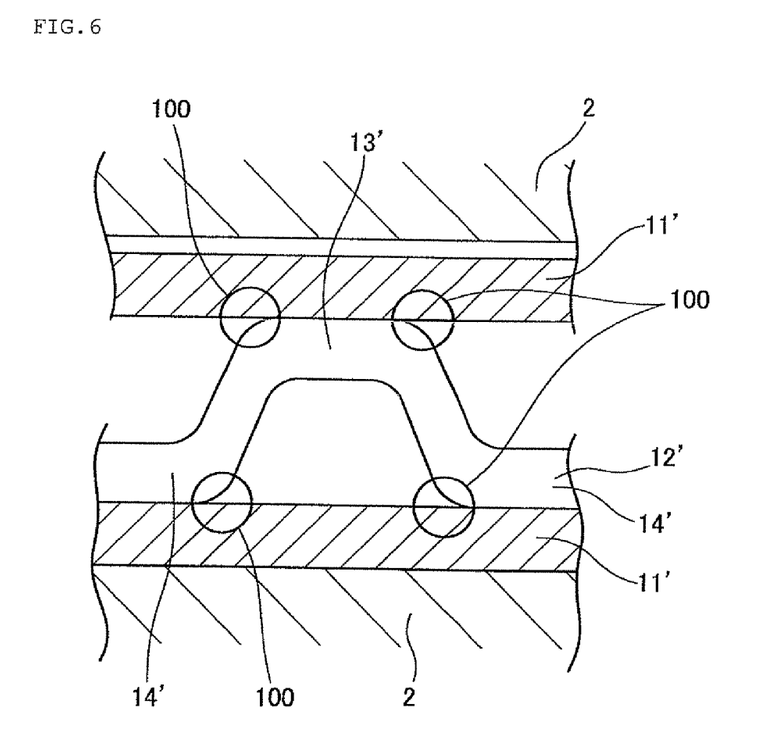
FIG. 6 is a front view illustrating a state where a conventional combined oil ring is assembled in a piston, which is observed from an outside in a radial direction of the oil ring.

In conventional combined oil rings, a size thereof in an axial direction is made smaller to reduce tension, in response to a demand for smaller friction. Unfortunately, along with passage of operating time of the internal combustion engine, carbon sludge is likely to be deposited between the spacer expander and the side rails. In particular, carbon sludge is likely to be deposited in a narrowest portion in a space between the side rails and the spacer expander or in corner parts 100 in which side rails 11' and a spacer expander 12' are in contact with each other as illustrated in FIG. 6. Hence, the conventional combined oil rings still have a problem that, if the internal combustion engine is operated for a long period of time, carbon sludge is gradually deposited in these portions, and hinders the engine oil from smoothly flowing out. Japanese Patent Laid-Open No. 2011-185383 does not describe specific numerical values for dimensions of the oil ring, and hence optimal dimensions and shape for solving the above-mentioned problem are required.

SUMMARY OF THE INVENTION

The present invention, which has been made in view of the above-mentioned problem, has an object to provide a combined oil ring in which carbon sludge is not deposited between side rails and a spacer expander even if an internal combustion engine is operated for a long period of time.

A combined oil ring according to the present invention is configured to be fitted in an oil ring groove of a piston, and includes: a pair of upper and lower plate-like circular side rails; and a spacer expander arranged between the pair of upper and lower side rails. The spacer expander includes: a large number of upper pieces and lower pieces that are alternately arranged in a circumferential direction so as to be spaced apart in an axial direction and the circumferential direction; coupling pieces that respectively couple the adjacent upper pieces and lower pieces; and ear parts that are each formed so as to erect in an inner circumferential end portion of each of the upper pieces and the lower pieces, and serve to push the side rails. At least one of an upper surface of each upper piece and a lower surface of each lower piece has a groove formed thereon. Each ear part has, formed therein, a through-hole with which the groove is communicated. The through-hole is formed such that a distance along the axial direction between one of an upper surface and a lower surface of each ear part at a top thereof and a deepest portion of the groove is equal to or more than 0.22 mm.

In the combined oil ring according to the present invention, it is preferable that a sectional area of the through-hole along the axial direction be set to be equal to or more than 0.10 mm$^2$.

In the combined oil ring according to the present invention, it is preferable that: the spacer expander include a side rail support part that is formed in an outer circumferential end portion of each of the upper pieces and the lower pieces so as to be one step higher than the groove; and a distance along the axial direction between the side rail support part and a groove edge part of the groove be set to 0.04 to 0.20 mm.

In the combined oil ring according to the present invention, it is preferable that a plate thickness of the spacer expander be set to 0.17 to 0.28 mm.

In the combined oil ring according to the present invention, it is preferable that the groove be formed along a radial direction.

In the combined oil ring according to the present invention, it is preferable that: the side rail support part have, formed therein, an opening communicated with the groove; and a sectional area of the opening along the axial direction be smaller than a sectional area of the through-hole along the axial direction.

In the combined oil ring according to the present invention, it is preferable that a ratio of: the distance along the axial direction between one of the upper surface and the lower surface of each ear part at the top thereof and the deepest portion of the groove; to the plate thickness of the spacer expander be 0.77 to 3.00.

In the combined oil ring according to the present invention, the distance along the axial direction between one of the upper surface and the lower surface of each ear part at the top thereof and the deepest portion of the groove is set to be equal to or more than 0.22 mm. Accordingly, a space between the side rails and the spacer expander can be made larger, scraped engine oil can be allowed to smoothly flow out, and deposition of carbon sludge can be prevented.

In the combined oil ring according to the present invention, the sectional area of the through-hole formed in each ear part, along the axial direction, is set to be equal to or more than 0.10 mm$^2$. Accordingly, the engine oil between the side rails and the spacer expander can be allowed to smoothly flow out to the piston side through the through-hole.

In the combined oil ring according to the present invention, a step corresponding to the distance along the axial direction between the side rail support part and the groove edge part of the groove is set to 0.04 to 0.20 mm. Accordingly, the space between the side rails and the spacer expander can be made larger, the scraped engine oil can be allowed to smoothly flow out, and deposition of carbon sludge on this area can be prevented. A particularly preferable range of the step is 0.12 to 0.20 mm. If the step is less than 0.04 mm, deposition of carbon sludge cannot be prevented. If the step exceeds 0.20 mm, strength of the spacer expander becomes insufficient, resulting in lower workability and a decrease in yield.

In the combined oil ring according to the present invention, the plate thickness of the spacer expander is set to 0.17 to 0.28 mm. Accordingly, the distance to the deepest portion of the groove and the sectional area of the through-hole defined above can be secured. A particularly preferable range of the plate thickness is 0.20 to 0.25 mm.

In the combined oil ring according to the present invention, the groove is formed along the radial direction. Accordingly, the engine oil smoothly flows out from an outer circumferential side to an inner circumferential side, whereby deposition of carbon sludge can be prevented.

In the combined oil ring according to the present invention, the side rail support part has, formed therein, the opening communicated with the groove, and the sectional area of the opening is set to be smaller than the sectional area of the through-hole. Accordingly, the engine oil more smoothly flows out from the outer circumferential side to the inner circumferential side, whereby deposition of carbon sludge can be prevented.

In the combined oil ring according to the present invention, the ratio of: the distance along the axial direction between one of the upper surface and the lower surface of each ear part at the top thereof and the deepest portion of the groove; to the plate thickness of the spacer expander is set to be 0.77 to 3.00. Accordingly, deposition of carbon sludge can be sufficiently suppressed. A particularly preferable range of the ratio is 1.00 to 2.50. If the ratio is less than 0.77, the area of the through-hole cannot be sufficiently secured, and the suppression of the deposition of carbon sludge becomes difficult. If the ratio exceeds 3.00, the strength of the spacer expander becomes insufficient, resulting in lower workability and a decrease in yield.

DETAILED DESCRIPTION OF THE PREFERRED EMBODIMENT

Hereinafter, a preferred embodiment for carrying out the present invention is described with reference to the drawings. The following embodiment does not limit an aspect of the present invention according to each claim, and all combinations of features described in the embodiment are not necessarily essential to solutions provided by the present invention.

Figure 1:
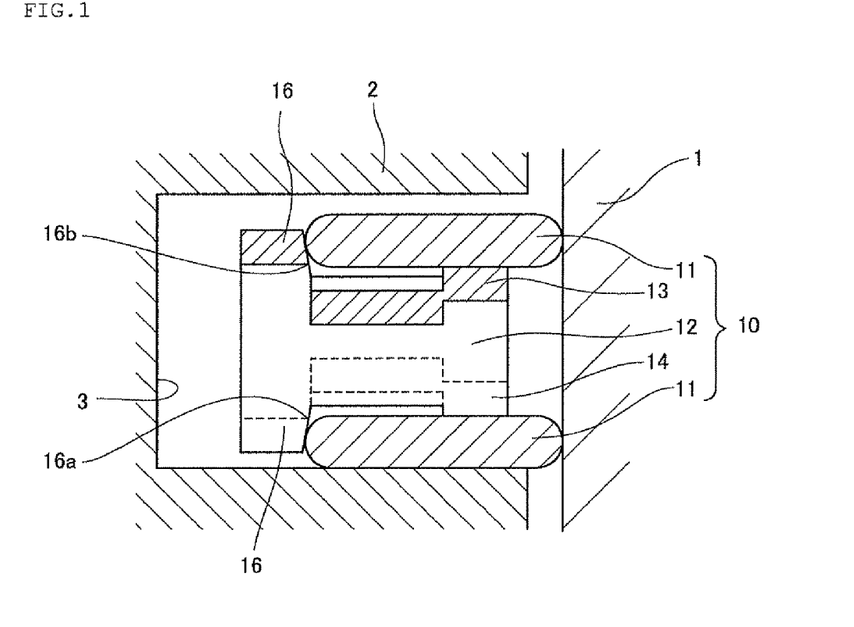
FIG. 1 is a sectional view illustrating a main part of an internal combustion engine in which a combined oil ring according to an embodiment of the present invention is assembled, which is taken at a top of an ear part in a cylinder axial direction of the internal combustion engine.

FIG. 1 is a sectional view illustrating a main part of an internal combustion engine in which a combined oil ring according to the embodiment of the present invention is assembled, which is taken at a top of an ear part in a cylinder axial direction of the internal combustion engine.

Figure 2:
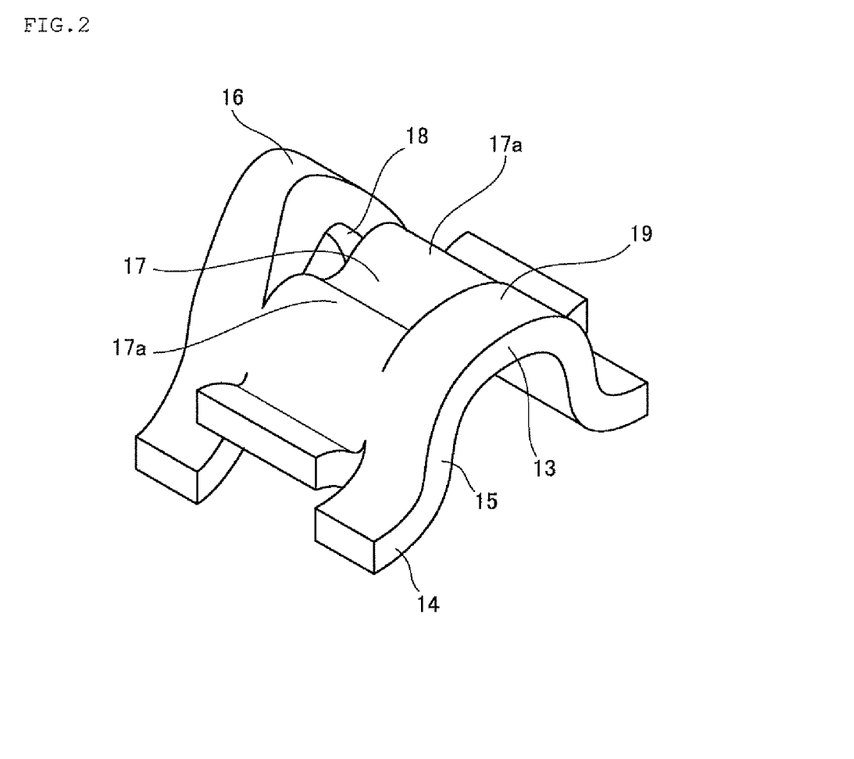
FIG. 2 is a perspective view illustrating part of a spacer expander used for the combined oil ring according to the embodiment of the present invention.
Figure 3:
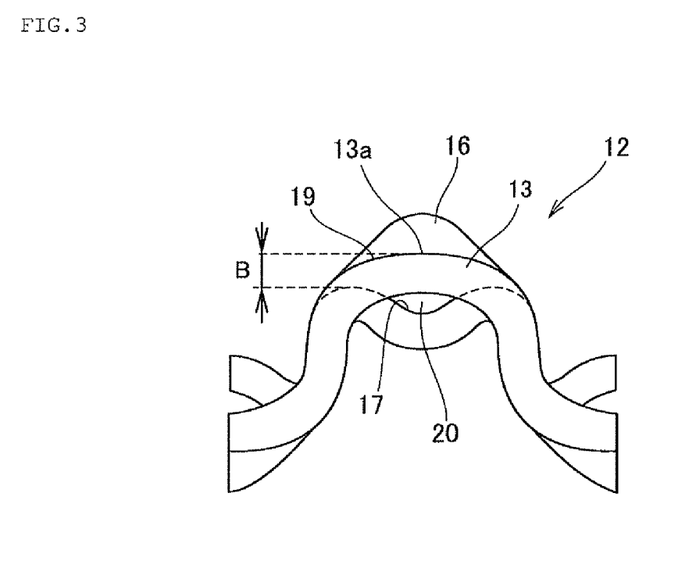
FIG. 3 is a front view illustrating part of the spacer expander used for the combined oil ring according to the embodiment of the present invention, which is observed from an outside in a radial direction of the oil ring.
Figure 4:
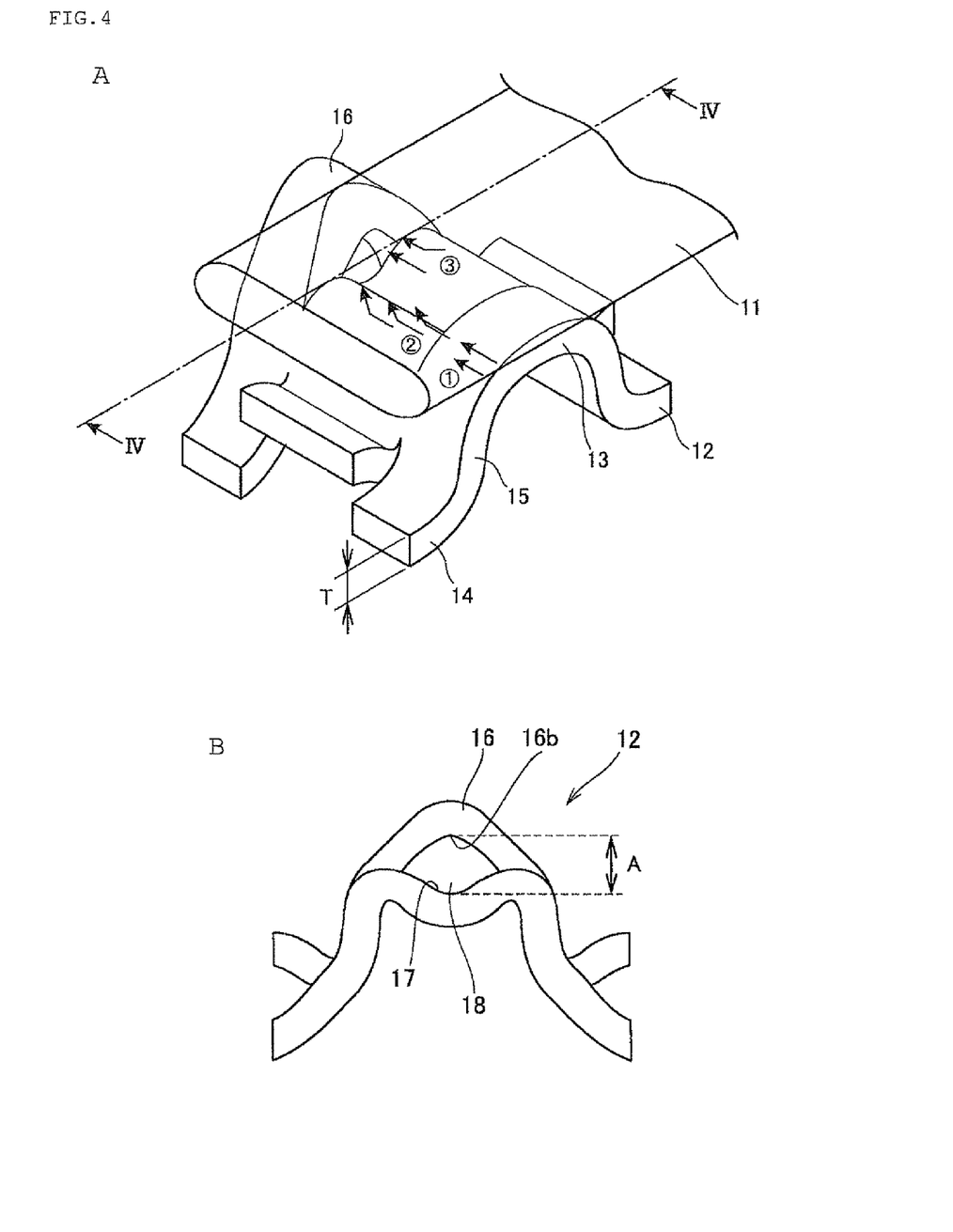
FIG. 4A is a perspective view illustrating part of the combined oil ring according to the embodiment of the present invention.
FIG. 4B is a sectional view taken along a line IV-IV in FIG. 4A.

FIG. 2 is a perspective view illustrating part of a spacer expander used for the combined oil ring according to the embodiment of the present invention. FIG. 3 is a front view illustrating part of the spacer expander used for the combined oil ring according to the embodiment of the present invention, which is observed from an outside in a radial direction of the oil ring. FIG. 4A is a perspective view illustrating part of the combined oil ring according to the embodiment of the present invention, and FIG. 4B is a sectional view taken along a line IV-IV in FIG. 4A.

As illustrated in FIG. 1, a combined oil ring 10 according to the present embodiment is assembled in an oil ring groove 3 formed on an outer circumferential surface of a piston 2 of the internal combustion engine so as to be in sliding contact with an inner wall of the cylinder 1, and the combined oil ring 10 thus scrapes extra engine oil attached to the inner wall of the cylinder 1, to thereby form a proper oil film on the inner wall of the cylinder 1.

The combined oil ring 10 includes a pair of upper and lower side rails 11, 11 and a spacer expander 12 arranged between the pair of upper and lower side rails 11, 11. The side rails 11, 11 and the spacer expander 12 are made of steel or the like, and each side rail 11 is configured as a plate-like circular ring including an gap (not illustrated).

As illustrated in FIG. 2, the spacer expander 12 is formed by plasticity processing of a steel material, and has a concavo-convex shape (corrugated shape) along an axial direction as well as a substantially circular shape along a circumferential direction. This concavo-convex shape in the axial direction defines upper pieces 13 and lower pieces 14 in an end portion in the axial direction. Specifically, the spacer expander 12 includes a large number of the upper pieces and the lower pieces 14 that are alternately arranged in the circumferential direction so as to be spaced apart in the axial direction and the circumferential direction. Coupling pieces 15 respectively couple the adjacent upper pieces 13 and lower pieces 14.

As illustrated in FIG. 1, ear parts 16 are each formed so as to erect in an arch-like shape in an inner circumferential end portion of each of the upper pieces 13 and the lower pieces 14 of the spacer expander 12, and the ear parts 16 respectively push the side rails 11, 11 to an outer circumferential side. As illustrated in FIG. 2, a through-hole 18 is formed along a radial direction in each ear part 16.

As illustrated in FIG. 2 and FIG. 3, a groove 17 is formed along the radial direction on each of an upper surface 13a of the upper piece 13 and a lower surface (not illustrated) of the lower piece 14. A sectional shape of the groove 17 along the axial direction is a V shape or an R shape. The V shape herein includes not only a shape having adjacent oblique surfaces that intersect with each other at a sharp angle, but also a shape having adjacent oblique surfaces that are continuous with each other while describing a circular arc as illustrated in FIG. 4B. A side rail support part 19 is formed in an outer circumferential end portion of each of the upper pieces 13 and the lower pieces 14 of the spacer expander 12 so as to be one step higher than groove edge parts 17a of the groove 17.

As illustrated in FIG. 3, an opening 20 is formed in the side rail support part 19 so as to be communicated with the groove 17, and a sectional area of the opening 20 along the axial direction is set to be smaller than a sectional area of the through-hole 18 formed in the ear part 16, along the axial direction.

In a state where the combined oil ring 10 is assembled in the oil ring groove 3 of the piston 2, the gap abut against each other, and the spacer expander 12 is contracted in the circumferential direction. Accordingly, the combined oil ring 10 is assembled such that expansion force is generated outward in the radial direction by tension of the spacer expander 12. Hence, the upper and lower side rails 11, 11 are vertically held by the side rail support parts 19, 19 of the upper pieces 13 and the lower pieces 14 along the axial direction, and the ear parts 16 respectively push inner circumferential surfaces of the side rails 11, whereby outer circumferential surfaces of the upper and lower side rails 11, 11 are brought into close contact with an inner wall surface of the cylinder 1.

Next, description is given of dimensions and a specific shape of each part and a flow path of the engine oil. As illustrated in FIG. 4B, a distance A along the axial direction between a lower surface 16b (or an upper surface) of the ear part at the top thereof and a deepest portion of the groove 17 is set to be equal to or more than 0.22 mm. With this configuration, as illustrated in FIG. 4A, a flow rate of the engine oil flowing in the groove 17 can be increased, and hence the engine oil scraped from the inner wall surface of the cylinder 1 can smoothly flow out from an outer circumferential side to an inner circumferential side along the groove 17.

As illustrated in FIG. 3, a step B corresponding to a distance along the axial direction between an upper surface (or a lower surface) of the side rail support part 19 and the groove edge part 17a of the groove 17 is set to 0.04 to 0.20 mm and, preferably, to 0.12 to 0.20 mm. Because the step B is formed at as large a size as described above, as illustrated in FIG. 4A, when the engine oil flows to the inner circumferential side along a flow path indicated by arrows (1) extending in a corner part in which the side rail 11 and the spacer expander 12 are in contact with each other, a flow rate of the engine oil that flows in a flow path indicated by arrows (2) extending toward the groove 17 can be secured at a given value or more. Hence, carbon sludge can be prevented from being deposited in the ear part 16.

In this case, if the sectional shape of the groove 17 along the axial direction is a V shape, the engine oil can flow more easily in the flow path indicated by the arrows (2).

The sectional area of the through-hole 18 formed in the ear part 16, along the axial direction, is set to be equal to or more than 0.10 mm$^2$. With this configuration, the engine oil that has flown in the groove 17 along a flow path indicated by arrows (3) can be smoothly discharged to the inner circumferential side without stagnating in the through-hole 18.

It is preferable that a plate thickness T of the steel material for forming the spacer expander 12 be set to 0.17 to 0.28 mm. The use of the plate material having such a small thickness enables satisfactory settings of the distance A to the deepest portion of the groove 17, the step B, and the sectional area of the through-hole 18.

It is preferable that a ratio A/T of: the distance A along the axial direction between the lower surface 16b (or the upper surface) of the ear part at the top thereof and the deepest portion of the groove 17; to the plate thickness T of the steel material for forming the spacer expander 12 be set to 0.77 to 3.00.

With this configuration, the sectional area of the through-hole 18 can be increased while stiffness and durability of the spacer expander 12 are maintained. Hence, the engine oil that flows in the groove 17 can be smoothly discharged, and deposition of carbon sludge can be suppressed. Such suppression of the deposition of carbon sludge can lead to a reduction in an amount of consumed oil.

Examples

Next, the present invention is described more in detail by way of examples, a comparative example, and a conventional example.

Examples

In each example adopting the above-mentioned grooved configuration ("GROOVED CONFIGURATION 2" in FIG. 5), used was a combined oil ring including two side rails and a spacer expander and having the following dimensions and shape. The two side rails had the same shape.

Example 1

Plate thickness of spacer expander: 0.22 mm, width thereof in axial direction (vertical direction in FIG. 1): 2.0 mm, and thickness thereof in radial direction (horizontal direction in FIG. 1): 2.3 mm Distance (distance A) along axial direction between upper surface or lower surface of ear part at top thereof and deepest portion of groove: 0.29 mm Distance B along axial direction between upper surface (or lower surface) of side rail support part and groove edge part of groove: 0.08 mm Sectional area of through-hole formed in ear part: 0.12 mm$^2$ Sectional shape of groove: V shape

Example 2

Distance (distance A) along axial direction between upper surface or lower surface of ear part at top thereof and deepest portion of groove: 0.23 mm Distance B along axial direction between upper surface (or lower surface) of side rail support part and groove edge part of groove: 0.08 mm Sectional area of through-hole formed in ear part: 0.10 mm$^2$ Sectional shape of groove: V shape

Example 3

Distance (distance A) along axial direction between upper surface or lower surface of ear part at top thereof and deepest portion of groove: 0.26 mm Distance B along axial direction between upper surface (or lower surface) of side rail support part and groove edge part of groove: 0.08 mm Sectional area of through-hole formed in ear part: 0.11 mm$^2$ Sectional shape of groove: V shape In each of the comparative example adopting a grooved configuration ("GROOVED CONFIGURATION 1" in FIG. 5) and the conventional example adopting an ungrooved configuration, a combined oil ring having the following dimensions and shape was used.

Comparative Example

Distance (distance A) along axial direction between upper surface or lower surface of ear part at top thereof and deepest portion of groove: 0.21 mm Distance B along axial direction between upper surface (or lower surface) of side rail support part and groove edge part of groove: 0.08 mm Sectional area of through-hole formed in ear part: 0.09 mm$^2$ Sectional shape of groove: V shape

Conventional Example

Step along axial direction from side rail support part: 0.07 mm

Sectional area of through-hole formed in ear part: 0.04 mm$^2$

Experiment for Checking Amount of Deposited Sludge

In an actual machine experiment using a gasoline engine for an automobile (a displacement of 1.6 liters, an in-line four-cylinder type) in which the combined oil ring according to each of the examples, the comparative example, and the conventional example was assembled, an amount of sludge deposited on a piston ring was checked. For operating conditions, a speed of the gasoline engine for an automobile was set to 4,000 rpm, and operating time thereof was set to 300 hours. Engine oil used in this experiment was deteriorated, and an oil return hole was expected to be closed by the sludge. Amounts of deposited sludge were each shown as a ratio when an amount of deposited sludge in the conventional example was defined as 1.

Figure 5:
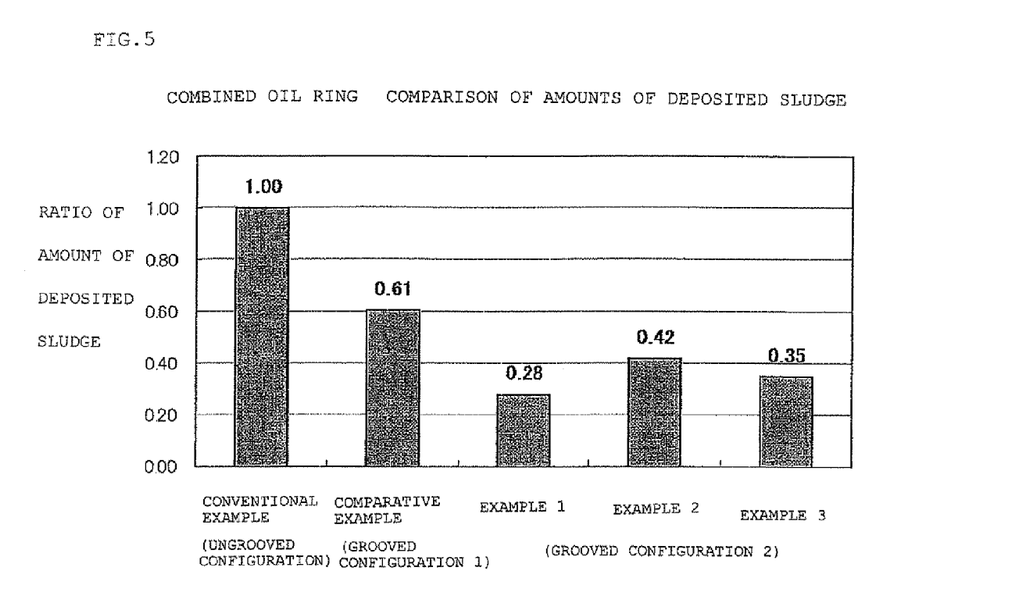
FIG. 5 shows experiment results of amounts of deposited sludge according to the embodiment of the present invention.

As is apparent from checking experiment results shown in FIG. 5, an amount of deposited sludge in Example 1 significantly decreases to 28% of that in the conventional example. Although an amount of deposited sludge in the comparative example adopting the grooved configuration 1 decreases to 61% of that in the conventional example, comparing the comparative example with the examples, an amount of deposited sludge in each example further decreases by about 30% or more with respect to that in the comparative example.

As described above, even compared with the combined oil ring adopting the conventional grooved configuration 1, in the combined oil ring according to each example, the amount of sludge deposited between the side rails and the spacer expander can be significantly reduced even if the internal combustion engine is operated for a long period of time. Accordingly, the combined oil ring according to each example can be considered to have optimal dimensions and shape.

In the combined oil ring 10 according to the present embodiment described above, the sectional shape of the groove 17 is a V shape. The sectional shape of the groove 17 is not limited thereto, and may be, for example, an R shape in section. As is apparent from contents of "What is claimed is", modes to which such change or improvement as described above is given can also be included in a technical scope of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2013-154699 filed on Jul. 25, 2013 including the specification, claims, drawings and summary is incorporated herein by reference in its entirety.

What is claimed is:

1. A combined oil ring to be fitted in an oil ring groove of a piston, comprising:
    a pair of upper and lower plate-like circular side rails; and
    a spacer expander arranged between the pair of upper and lower side rails,
    the spacer expander including:
    a plurality of upper pieces and lower pieces that are alternately and adjacently arranged in a circumferential direction so as to be spaced apart in an axial direction and the circumferential direction;
    coupling pieces that respectively couple each upper piece to the adjacent lower piece;
    ear parts that are each formed so as to stand erect in an inner circumferential end portion of each of the upper pieces and the lower pieces, and each ear part serves to push one of the side rails;
    an upper surface of each upper piece and a lower surface of each lower piece having a groove formed thereon; and
    side rail support parts that are respectively formed in an outer circumferential end portion of each of the upper pieces and the lower pieces so as to be one step higher than one of the grooves;
    each ear part having, formed therein, a through-hole with which a respective one of the grooves is in communication,
    wherein all of the through-hole of each ear part is formed such that a distance A, which is an axial distance between a highest or lowest portion of an inner surface of a respective ear part located on a respective upper piece or lower piece and a deepest portion of the upper surface or the lower surface of the groove corresponding to the respective ear part which the groove is in communication with, is equal to or greater than 0.22 mm, wherein a sectional area of each through-hole along the axial direction is set to be equal to or more than 0.10 mm2, wherein each side rail support part comprises an opening in communication with a corresponding one of the grooves, wherein each of the openings and a corresponding one of the through-holes constitutes a line of sight path for a fluid to pass through the spacer expander, wherein a plate thickness T of the spacer expander is set to 0.17 to 0.28 mm, wherein a ratio A to T is 0.77 to 2.50, wherein a distance B along the axial direction between one of the side rail support parts and a groove edge part of one of the grooves corresponding to the one of the side rails is set to 0.04 to 0.20 mm, wherein each groove is formed along a radial direction, and wherein each ear part has a substantially pointy arch-like shape in a view along the line-of-sight path.

2. The combined oil ring according to claim 1, wherein a sectional area of each opening along the axial direction is smaller than a sectional area of each through-hole along the axial direction.

3. The combined oil ring according to claim 1, wherein each ear part has a substantially triangular shape in the view along the line-of-sight path.

* * * * *